Nov. 11, 1958  R. A. GLASSON  2,859,478
MOLD STRUCTURE
Filed Sept. 23, 1954  2 Sheets-Sheet 1
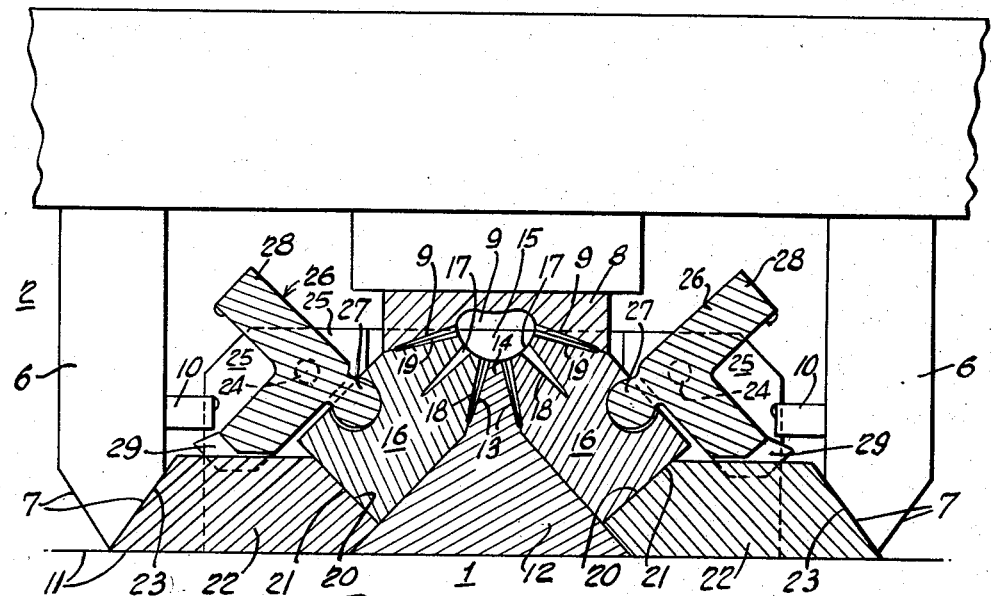
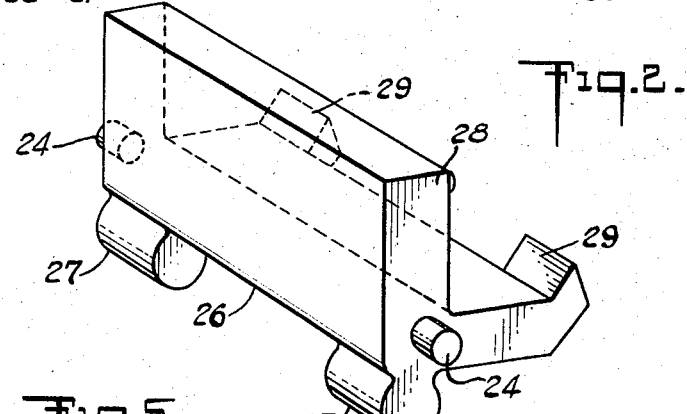
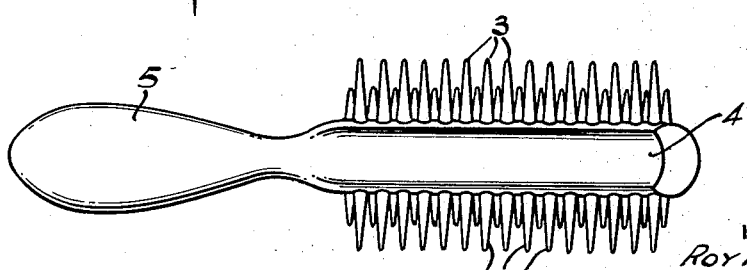
INVENTOR
ROY ACTON GLASSON
BY Leroy F. Halley
ATTORNEY Nov. 11, 1958  R. A. GLASSON  2,859,478
MOLD STRUCTURE
Filed Sept. 23, 1954  2 Sheets-Sheet 2
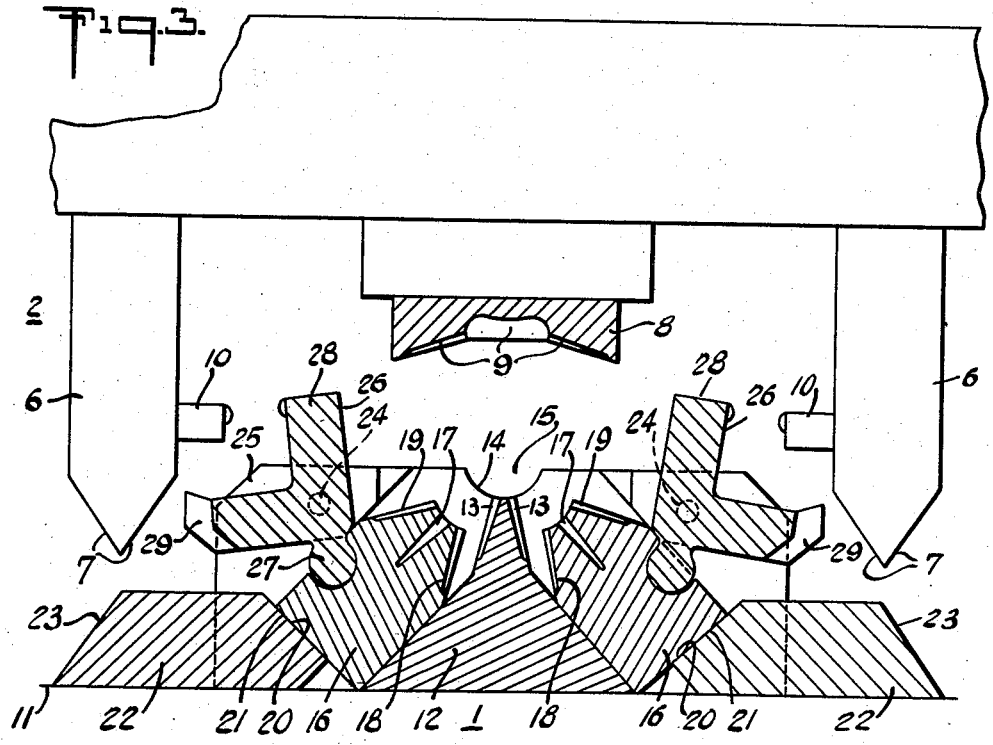
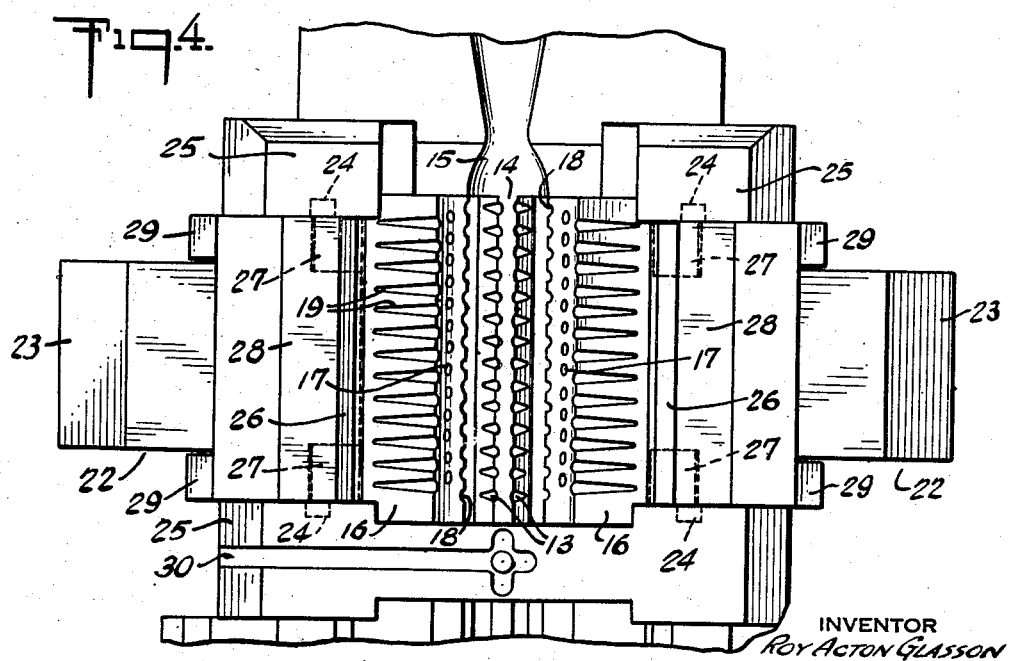
INVENTOR
ROY ACTON GLASSON
BY
ATTORNEY

United States Patent Office 2,859,478
Patented Nov. 11, 1958

2,859,478

MOLD STRUCTURE

Roy Acton Glasson, Syke Cluan, Iver, England, assignor, by mesne assignments, to Johnson & Johnson, New Brunswick, N. J., a corporation of New Jersey Application September 23, 1954, Serial No. 457,930

Claims priority, application Great Britain June 21, 1954

16 Claims. (Cl. 18—42)

This invention relates to moulding tools for producing under pressure mouldings of such shape as to require that the die element of the tool shall comprise retractable parts. Although not limited thereto, the invention is particularly applicable to injection moulding of plastics.

In the case of mouldings shaped such as to require that the die shall have at least one cavity, with an unbroken wall, extending in a direction out of alignment with the operative axis of the tool the problem arises as to extracting the moulded article out of the die. It is known in such cases to provide movable die components, and hitherto these have generally been movable either in the direction of the operative axis of the tool or at right angles to that direction. The difficulty has been to ensure that the moving parts are held rigid in the operative position under the high pressures set up during the compression of the moulding material in the mould, or the pressures set up when the material to be moulded is injected into the mold.

The object of the present invention is to overcome such difficulties as aforesaid and to provide a moulding tool of the type including a closing member (hereinafter called "plunger") and a die, for producing mouldings under pressure; with a die having one or more retractable components which will be secured absolutely rigidly during the moulding operations.

According to the invention, the die comprises a retractable component formed with a cavity extending in a direction out of alignment with the operative axis of the tool and mounted so as to be slidable with respect to an adjacent component into and out of operative combination with the latter in the direction of the cavity so as to be withdrawable from the moulded material therein, and a block adapted to be wedged between the retractable component and a member carried by the tool part carrying the plunger whereby the retractable component is securely locked against displacement during a moulding operation.

The wedge block is preferably devised so as to be slidable, on a surface at right angles to the operative axis of the tool, into and out of locking position. The wedge block may then have surfaces inclined to the surface on which it is slidable, for sliding engagement respectively with a surface on the retractable component of the die and a surface on the member carried by the tool part carrying the plunger. Said surface on the retractable component is preferably substantially at right angles to the direction of sliding of the retractable component.

A device for operating the sliding movement of the retractable component of the die may be mounted adjacent to the die and adapted to be automatically actuated in one sense as the tool parts come together, and in the opposite sense as the tool parts separate. Thus, said device may be adapted to be actuated by engagement with the aforesaid member fixed with respect to the tool part carrying the plunger. By way of example, the device may be a toggle element with a knuckle engagement with the retractable component of the die and with its arms adapted to be struck by the member which is fixed with respect to the tool part carrying the plunger so as to be rocked to operate the retractable component.

The part of the die lying adjacent to the retractable component is preferably a fixed part which provides a surface for the retractable component to slide upon. The retractable component and the adjacent component of the die may be recessed to form between them, in operative combination, another die cavity which is out of alignment with the operative axis of the tool, so that moulded material therein is freed to be withdrawn with the moulding when the retractable component has been retracted from operative combination with its adjacent component of the die.

It will be appreciated that the die may comprise more than one retractable component slidable with respect to an adjacent component.

The invention is particularly applicable for moulding brush-like articles having so-called "bristles" integral with a base member and with a handle forming a continuation of the base member.

The drawings accompanying the specification illustrate an embodiment of the invention suitable for such purpose.

In the drawings:

Figure 1 is a sectional elevation of the moulding parts of a vertically operating injection moulding press tool, shown in the closed and operative position;

Figure 2 is a perspective view of the mould part operable to open and close the mould;

Figure 3 is a sectional elevation similar to Figure 1 but showing the die in its open position;

Figure 4 is a plan view of Figure 3; and

Figure 5 is a plan view of the brush-like article which is moulded in the tool shown in Figures 1, 3 and 4.

Referring to the drawings, 1 indicates generally the part of the tool which carries the die and 2 indicates generally the movable tool part carrying the plunger.

It will be seen from Figure 5 that the moulded article is shaped so as to require that the die shall have a large number of bristles 3 radiating from a base member 4 having a handle 5, the whole article being an integral moulding suitably made of a plastic.

The upper tool part has fixed to it depending members 6 with sloping surfaces 7 on their lower ends. The reference numeral 8 indicates a plunger carried by the upper tool part and having a cavity 9 corresponding to the shape of the upper part of the base member 4, of the handle 5, and of the top rows of bristles of the brush shown in Figure 5.

The depending members 6 are provided on their inner side with projections 10 for a purpose hereinafter described.

The lower part 1 of the tool is mounted on a fixed rigid surface indicated by the line 11. Fixed with respect to the surface 11 is an immovable die component 12. This part is formed with a number of recesses 13 corresponding to the lower parts of the lower rows of bristles of the brush to be moulded. The top of the die component 12 is shaped as shown at 14 to provide the bottom part of a die cavity 15 corresponding to the bottom portion of the base member 4 and handle 5 of the brush to be moulded.

Slidably mounted on the sloping surface of the fixed die part 12 are two retractable die components 16. Each of these is formed with a series of complete cavities 17 corresponding to the rows of bristles of the brush intermediate between the top and bottom rows. It will be observed that these cavities 17 extend in a direction oblique to the vertical and therefore out of alignment with the operative axis of the tool. It will further be observed that these cavities 17 lie in a direction parallel to the sloping faces of the die part 12.

Each of the retractable components 16 is further formed with recesses 18 which, when the die is closed as shown in Figure 1, form with the recesses 13 of the fixed die part 12 complete cavities for the lower rows of bristles of the brush. Also the die components 16 are formed with upper recesses 19 which, when the die is closed and the plunger 8 is down, form with the radiating recesses 9 of the plunger complete cavities for the top rows of bristles of the brush.

The bottom end portions of the die components 16 have surfaces 20 at right angles to the sloping surface of the die part 12. These are in sliding relationship with surfaces 21 of wedge blocks 22. These wedge blocks have outer sloping surfaces 23 parallel to the inner sloping surfaces 7 of the members 6 carried by the upper tool part.

Pivoted at 24 to a fixed part 25 of the bottom tool are toggle elements 26 which have knuckles 27 engaging in corresponding recesses in the retractable die components 16. The toggle elements 26 have arms 28 and 29.

It will be seen that as the upper tool part 2 comes down towards the lower tool part 1 the projection 10 of the members 6 carried by the upper tool part will strike the arms 29 of the toggles and will cause the latter to rock and thus move the die components 16 slidably into the closed position shown in Figure 1. Conversely, when the tool parts separate, the projection 10 will strike the arms 28 of the toggles, causing them to rock in the opposite sense and thus move the components 16 slidably out of the operative position, thus opening the die and enabling the moulded brush with its several rows of radiating bristles to be readily removed from the die.

Towards the end of the downward movement of the upper tool part 2 the inner sloping surfaces 7 of the members 6 will engage the sloping surfaces 23 of the wedge blocks 22 and will thus move the wedge blocks to follow up the inward movement of the die components 16, the surfaces 21 of the wedge blocks sliding against the surfaces 20 of the die components 16. When the tool is closed as shown in Figure 1 the wedge blocks 22 will be tightly wedged between the members 6 and the die components 16 and the latter will accordingly be held immovable even under high pressure within the mould tending to open the die.

In Figure 4 the reference numeral 30 indicates the passage or sprue for the introduction of the injected plastic into the mould when the latter is closed.

It is apparent that numerous changes, modifications and variations may be made without departing from the spirit and scope of the invention as set forth in the appended claims.

What is claimed is:

1. A moulding tool comprising a die, a die supporting part, a plunger carrying part movable along an operative axis toward and away from said die supporting part, said die comprising at least one retractable component having at least one cavity extending in a direction oblique to the operative axis of the plunger carrying part and an adjacent component with respect to which said retractable component is slidable into and out of operative combination therewith in the direction of said cavity, a block adapted to lock said retractable component in position, said block being adapted to be wedged between said retractable component and a member on said plunger carrying part whereby said retractable component is securely locked against displacement during a moulding operation.

2. A moulding tool comprising a die, a die supporting part, a plunger carrying part movable along an operative axis toward and away from said die supporting part, said die comprising at least one retractable component having at least one cavity extending in a direction oblique to the operative axis of the plunger carrying part and an adjacent component with respect to which said retractable component is slidable into and out of operative combination therewith in the direction of said cavity, a block adapted to lock said retractable component in position, said block being supported by a surface at right angles to the operative axis of the plunger carrying part and being slidable thereon into and out of locking position, said block being adapted to be wedged between said retractable component and a member on said plunger carrying part whereby said retractable component is securely locked against displacement during a moulding operation.

3. A moulding tool comprising a die, a die supporting part, a plunger carrying part movable along an operative axis toward and away from said die supporting part, said die comprising at least one retractable component having at least one cavity extending in a direction oblique to the operative axis of the plunger carrying part and an adjacent component with respect to which said retractable component is slidable into and out of operative combination therewith in the direction of said cavity, a block adapted to lock the retractable component in position, said block being supported by a surface at right angles to the operative axis of the plunger carrying part and being slidable thereon into and out of locking position, said block having surfaces inclined to the surface by which it is supported for sliding engagement respectively with a surface on the retractable component part and a surface on a member carried by the plunger carrying part, said member being adapted to securely lock the retractable component during a moulding operation.

4. A moulding tool comprising a die, a die supporting part, a plunger carrying part movable along an operative axis toward and away from said die supporting part, said die comprising at least one retractable component having at least one cavity extending in a direction oblique to the operative axis of the plunger carrying part and an adjacent component with respect to which said retractable component is slidable into and out of operative combination therewith in the direction of said cavity, a block adapted to lock the retractable component in position, said block being supported by a surface at right angles to the operative axis of the plunger carrying part and being slidable thereon into and out of locking position, said block having surfaces inclined to the surface by which it is supported for sliding engagement respectively with a surface on the retractable component part which surface is substantially at right angles to the direction of sliding of said part and a surface on a member carried by the plunger carrying part, said member being adapted to securely lock the retractable component during the moulding operation.

5. A moulding tool comprising a die, a die supporting part, a plunger carrying part movable along an operative axis toward and away from said die supporting part, said die comprising at least one retractable component having at least one cavity extending in a direction oblique to the operative axis of the plunger carrying part and an adjacent component with respect to which said retractable component is slidable into and out of operative combination therewith in the direction of said cavity, said retractable component and said adjacent component of the die being recessed to form between them, in operative combination, another die cavity which is out of alignment with the operative axis of the plunger carrying part, a block adapted to lock said retractable component in position, said block being adapted to be wedged between said retractable component and a member on said plunger carrying part whereby said retractable component is securely locked against displacement during a moulding operation.

6. A moulding tool comprising a die, a die supporting part, a plunger carrying part movable along an operative axis toward and away from said die supporting part, said die comprising at least one retractable component having at least one cavity extending in a direction out of alignment with the operative axis of the plunger carrying part and an adjacent component with respect to which said retractable component is slidable into and out of operative combination therewith in the direction of said cavity, means for operating the sliding movement of the retractable component of the die, said means being mounted adjacent the die and being adapted to be automatically actuated in one direction as the tool parts come together and in the opposite direction as the tool parts separate, a block adapted to lock the retractable component in position, said block being adapted to be wedged between said retractable component and a member on said plunger carrying part whereby said retractable component is securely locked against displacement during a moulding operation.

7. A moulding tool comprising a die, a die supporting part, a plunger carrying part movable along an operative axis toward and away from said die supporting part, said die comprising at least one retractable component having at least one cavity extending in a direction out of alignment with the operative axis of the plunger carrying part and an adjacent component with respect to which said retractable component is slidable into and out of operative combination therewith in the direction of said cavity, means for operating the sliding movement of the retractable component of the die, said means being mounted adjacent to the die and being automatically actuated by engagement with means on said plunger carrying part in one direction as the parts come together and in the opposite direction as the parts separate, a block adapted to lock the retractable component in position, said block being adapted to be wedged between said retractable component and a member on said plunger carrying part whereby said retractable component is securely locked against displacement during a moulding operation.

8. A moulding tool comprising a die, a die supporting part, a plunger carrying part movable along an operative axis toward and away from said die supporting part, said die comprising at least one retractable component having at least one cavity extending in a direction out of alignment with the operative axis of the plunger carrying part and an adjacent component with respect to which said retractable component is slidable into and out of operative combination therewith in the direction of said cavity, a block adapted to lock said retractable component in position, said plunger carrying part having means for securely locking the retractable component against displacement during a moulding operation, a toggle element mounted adjacent the die for operating the sliding movement of the retractable component and having a knuckle engagement therewith, said toggle element being adapted to be actuated by engagement with the means on the plunger carrying part for securely locking the retractable component.

9. A moulding tool comprising a die, a die supporting part, a plunger carrying part movable along an operative axis toward and away from said die supporting part, said die comprising at least one retractable component having at least one cavity extending in a direction out of alignment with the operative axis of the plunger carrying part and an adjacent component with respect to which said retractable component is slidable into and out of operative combination therewith in the direction of said cavity, a block adapted to lock said retractable component in position, said plunger carrying part having means for securely locking the retractable component against displacement during a moulding operation, a toggle element mounted adjacent the die for operating the sliding movement of the retractable component and having a knuckle engagement therewith, said toggle element having arms adapted to be struck by the means on the plunger carrying part so as to be rocked to operate the retractable component.

10. A moulding tool comprising a die, a die supporting part, a plunger carrying part movable along an operative axis toward and away from said die supporting part, said die comprising at least one retractable component having at least one cavity extending in a direction oblique to the operative axis of the plunger carrying part and an adjacent component with respect to which said retractable component is slidable into and out of operative combination therewith in the direction of said cavity, said adjacent component having a surface upon which said retractable component is slidable substantially parallel to the direction of the cavity in said retractable component, means for operating the sliding movement of the retractable component of the die, a block adapted to lock the retractable component in position, said block being adapted to be wedged between said retractable component and a member on said plunger carrying part whereby said retractable component is securely locked against displacement during a moulding operation.

11. A moulding tool comprising a die, a die supporting part, a plunger carrying part movable along an operative axis toward and away from said die supporting part, said die comprising at least one retractable component having at least one cavity extending in a direction oblique to the operative axis of the plunger carrying part and an adjacent component with respect to which said retractable component is slidable into and out of operative combination therewith in the direction of said cavtiy, means mounted adjacent the die in engagement with the retractable component adapted to be automatically actuated in one direction as the tool parts come together and in the opposite direction as tool parts separate, a block adapted to lock the retractable component in position, said block being adapted to be wedged between said retractable component and a member on said plunger carrying part whereby said retractable component is securely locked against displacement during a moulding operation.

12. A moulding tool comprising a die, a die supporting part, a plunger carrying part movable along an operative axis toward and away from said die supporting part, said die comprising at least one retractable component having at least one cavity extending in a direction oblique to the operative axis of the plunger carrying part and an adjacent component with respect to which said retractable component is slidable into and out of operative combination therewith in the direction of said cavity, a block adapted to lock the retractable component in position, said block being supported by a surface at right angles to the operative axis of the plunger carrying part and being slidable thereon into and out of locking position, said block having surfaces inclined to the surface by which it is supported for sliding engagement respectively with a surface on the retractable component part and a surface on a member carried by the plunger carrying part, means mounted adjacent the die for operating the sliding movement of the retractable component, said means being automatically actuated by engagement with means on said plunger carrying part in one direction as the parts come together and in the opposite direction as the parts separate.

13. A moulding tool comprising a die, a die supporting part, a plunger carrying part movable along an operative axis toward and away from said die supporting part, said die comprising at least one retractable component having at least one cavity extending in a direction oblique to the operative axis of the plunger carrying part and an adjacent component with respect to which said retractable component is slidable into and out of operative combination therewith in the direction of said cavity, a block adapted to lock the retractable component in position, said block being supported by a surface at right angles to the operative axis of the plunger carrying part and being slidable thereon into and out of locking position, said block having surfaces inclined to the surface by which it is supported for sliding engagement respectively with a surface on the retractable component part and a surface on a member carried by the plunger carrying part, a toggle element mounted adjacent the die for operating the sliding movement of the retractable component and having a knuckle engagement therewith, said toggle element being adapted to be actuated by engagement with means on the plunger carrying part, said block being adapted to be wedged between said retractable component and a member on said plunger carrying part whereby said retractable component is securely locked against displacement during a moulding operation.

14. A moulding tool comprising a die, a die supporting part, a plunger carrying part movable along an operative axis toward and away from said die supporting part, said die comprising at least one retractable component having at least one cavity extending in a direction oblique to the operative axis of the plunger carrying part and an adjacent component with respect to which said retractable component is slidable into and out of operative combination therewith in the direction of said cavity, a block adapted to lock the retractable component in position, said block being supported by a surface at right angles to the operative axis of the plunger carrying part and being slidable thereon into and out of locking position, said block having surfaces inclined to the surface by which it is supported for sliding engagement respectively with a surface on the retractable component part and a surface on a member carried by the plunger carrying part, said member being adapted to securely lock the retractable component against displacement during a moulding operation, a toggle element mounted adjacent the die for operating the sliding movement of the retractable component and having a knuckle engagement therewith, said toggle element having arms adapted to be struck by means on the plunger carrying part so as to be rocked to operate the retractable component.

15. A moulding tool comprising a die, a die supporting part, a plunger carrying part movable along an operative axis toward and away from said die supporting part, said die comprising at least one retractable component having at least one cavity extending in a direction oblique to the operative axis of the plunger carrying part and an adjacent component with respect to which said retractable component is slidable into and out of operative combination therewith in the direction of said cavity, said retractable component and said adjacent component of the die being recessed to form between them, in operative combination, another die cavity which is out of alignment with the operative axis of the plunger carrying part, means mounted adjacent the die for operating the sliding movement of the retractable component, said means being automatically actuated by engagement with means on said plunger carrying part in one direction as the parts come together and in the opposite direction as the parts separate, a block adapted to lock said retractable component in position, said block being adapted to be wedged between said retractable component and a member on said plunger carrying part whereby said retractable component is securely locked against displacement during a moulding operation.

16. A moulding tool comprising a die, a die supporting part, a plunger carrying part movable along an operative axis toward and away from said die supporting part, said die comprising at least one retractable component having at least one cavity extending in a direction oblique to the operative axis of the plunger carrying part and an adjacent component with respect to which said retractable component is slideable into and out of operative combination therewith in the direction of said cavity, and means for securely locking the retractable component against displacement during a moulding operation.

References Cited in the file of this patent
UNITED STATES PATENTS 2,292,593    Amigo _____ Aug. 11, 1942